United States Patent

[11] 3,575,125

[72] Inventors Aaron L. Welsh
 116 Smith Place;
 Robert T. Cribb, 115 Smith Place, Warner Robins, Ga. 31093
[21] Appl. No. 819,276
[22] Filed Apr. 25, 1969
[45] Patented Apr. 13, 1971

[54] SURFACE VEHICLE WITH WINGED AND COUNTERBALANCED OPERATOR'S STATION
 4 Claims, 8 Drawing Figs.
[52] U.S. Cl. .................................................. 114/235, 272/1
[51] Int. Cl. ...................................................... B63b 21/00
[50] Field of Search .......................................... 114/235 (WS); 272/1, 1 (C);115/6.1, 70; 9/310

[56] References Cited
 UNITED STATES PATENTS
 1,910,655 5/1933 Traver .......................... 272/1(C)
 1,927,938 9/1933 Huffman ...................... 272/1(C)

Primary Examiner—Trygve M. Blix
Attorneys—Clarence A. O'Brien and Harvey B. Jacobson ABSTRACT: An elongated water planing assembly adapted to be pulled over and to plane upon the surface of a body of water and including an upwardly projecting support structure from whose upper end an elongated beam is supported for swinging in a vertical plane about a horizontal axis extending transversely of the support structure and the beam intermediate the opposite ends of the latter. The beam includes occupant supporting structure on its trailing end and an expansion spring is secured between its forward end and a lower portion of the support structure for counterbalancing the weight of the occupant on the trailing end of the beam. Further, the occupant-supporting structure at the trailing end of the beam includes a control for remotely adjusting the effective tension of the expansion spring.

Patented April 13, 1971
3,575,125
3 Sheets-Sheet 1
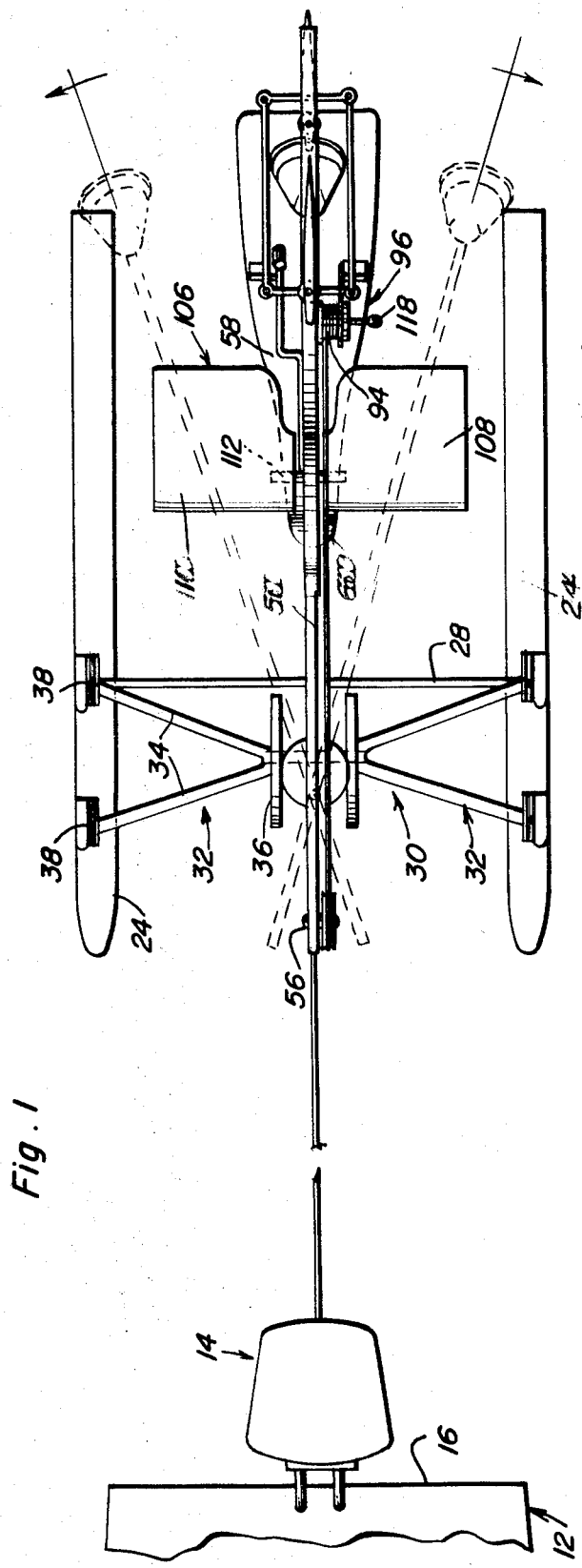
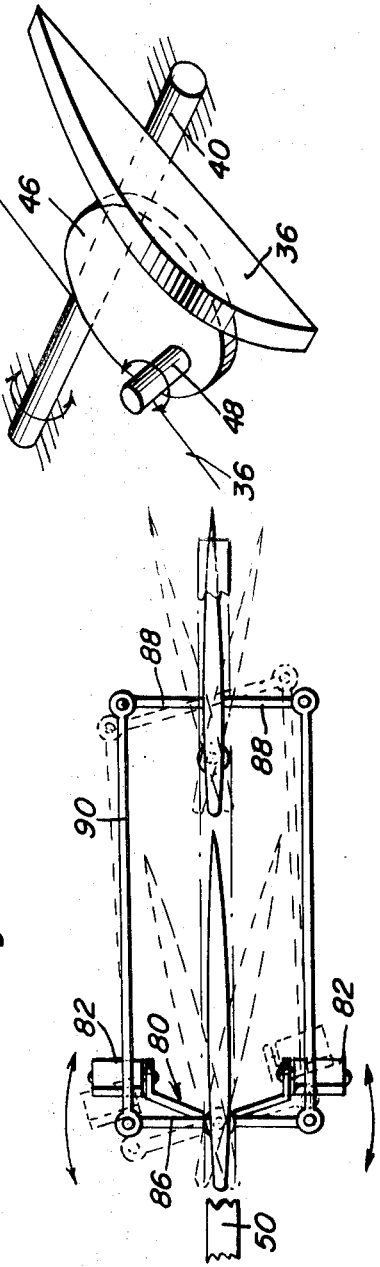
Fig. 6
Fig. 5
Fig. 1
Aaron L. Welsh
Robert T. Cribb
  INVENTORS
BY

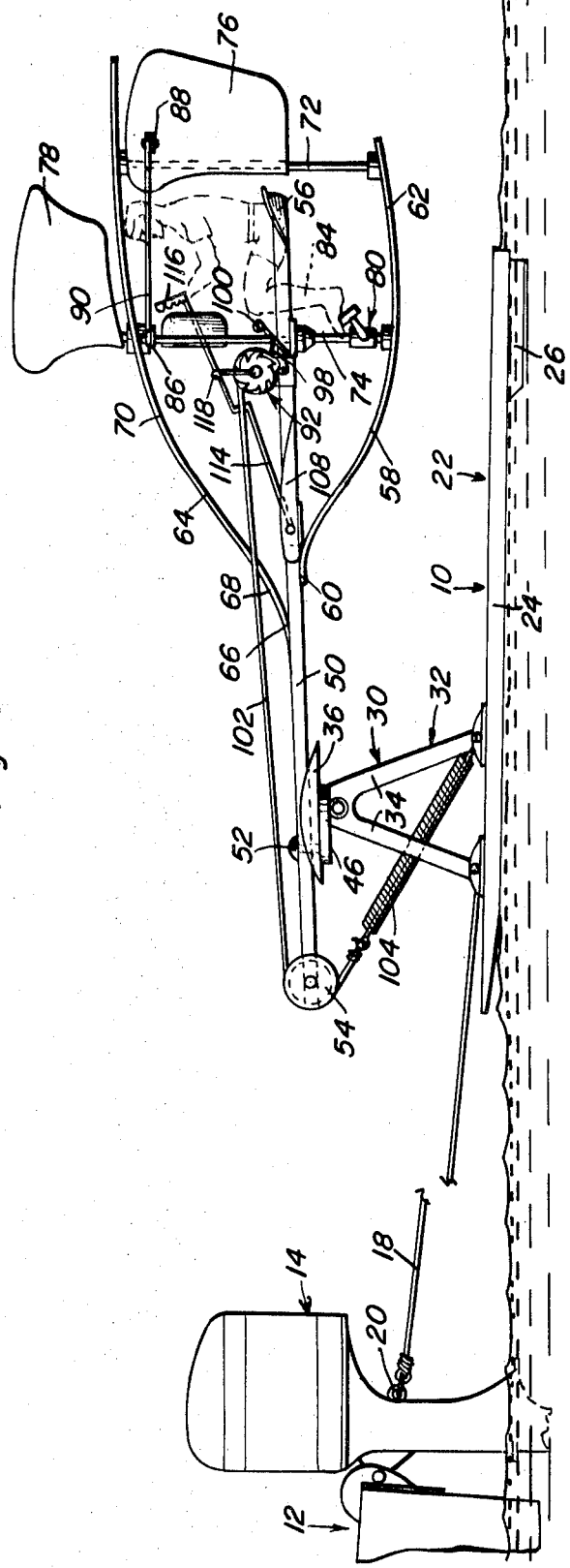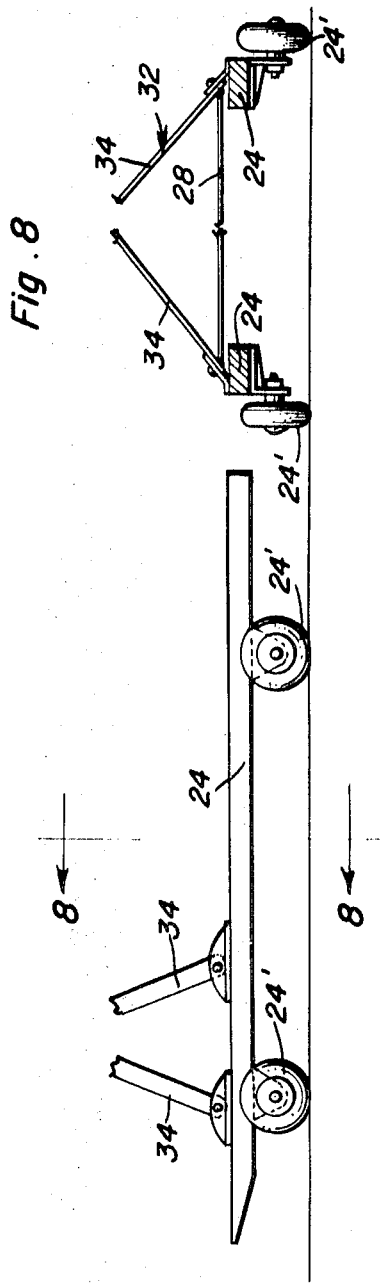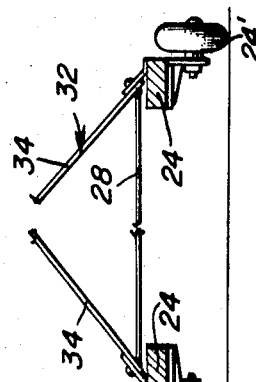
Aaron L. Welsh
Robert T. Cribb
INVENTORS

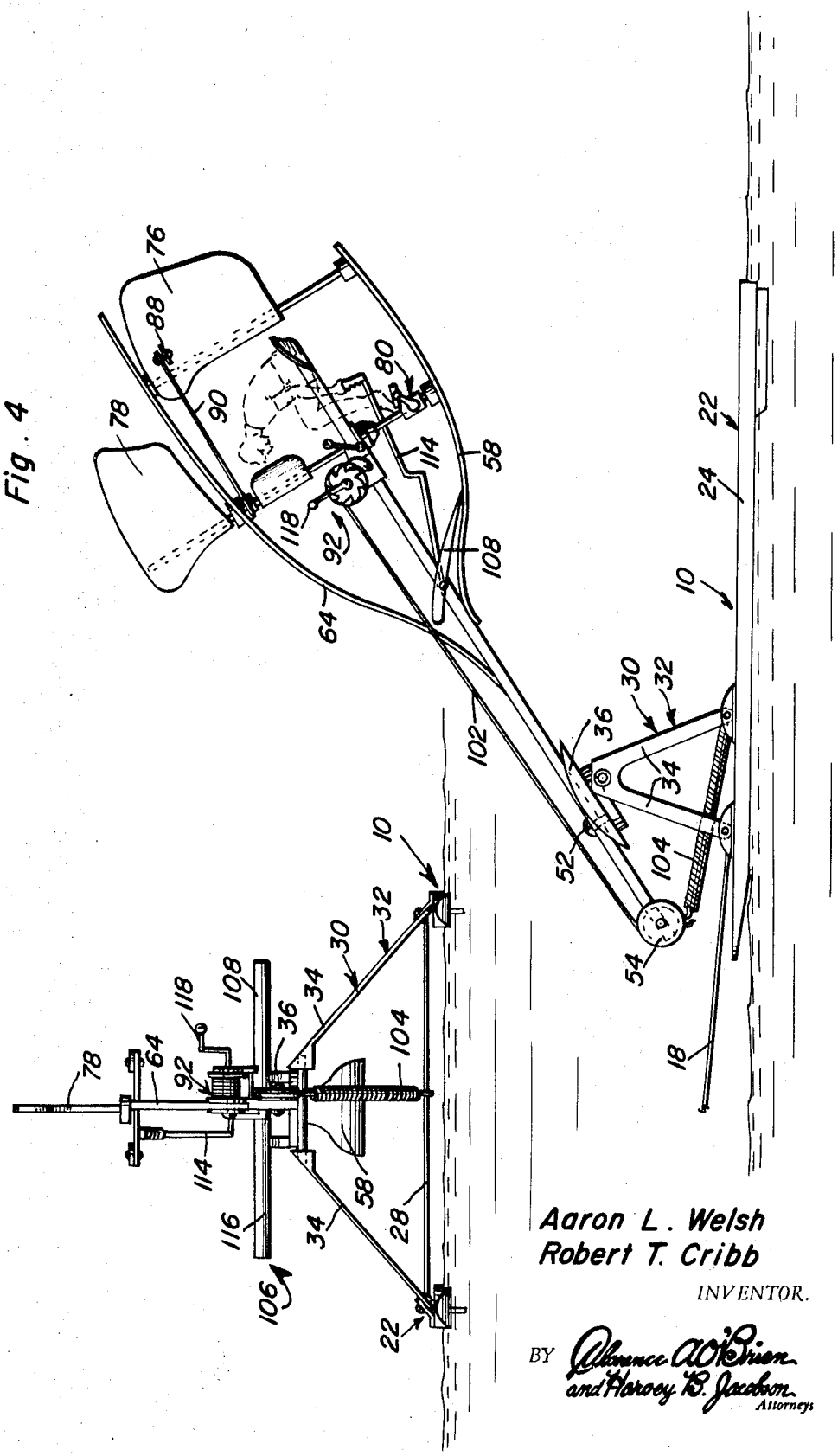

SURFACE VEHICLE WITH WINGED AND COUNTERBALANCED OPERATOR'S STATION

The surface vehicle of the instant invention has been designed to provide a conveyance which may be ridden by one or more persons and towed behind a motorboat. The vehicle includes a spring-counterbalanced support beam oscillatably supported from the water-planing structure thereof and the occupant supporting end of the beam includes movable airfoil structures and a control for remotely adjusting the effective counterbalancing effect of the counterbalance spring for the beam.

Although the vehicle is specifically illustrated and described hereinafter as a water vehicle, it is to be noted that it could also be readily utilized on snow-covered ground surfaces as well as ground surfaces without snow cover if the water-planing structure or assembly of the vehicle is provided with suitable ground-engaging support wheels.

The main object of this invention is to provide an amusement vehicle designed primarily for use on water and which may be controlled by an occupant to at least partially simulate aircraft flight and control movements.

A further important object of this invention is to provide a vehicle in accordance with the immediately preceding object including movable airfoil control surfaces actuatable to effect some steering control over the vehicle as it is being towed behind a boat.

A further object of this invention is to provide a device in accordance with the preceding objects and including further movable airfoil control surfaces operable to vary the elevation of the occupant-supporting portion of the vehicle above the surface of the water over which the vehicle is being towed.

Another important object of this invention is to provide means whereby the vehicle may be adjusted so as to fully compensate for riders or occupants of different weights.

A final object of this invention to be specifically enumerated herein is to provide a vehicle in accordance with the preceding objects which will conform to conventional forms of manufacture, be of simple construction and amusing to use so as to provide a device that will be economically feasible, long lasting and entertaining.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the vehicle with alternate positions of the occupant-supporting beam member thereof illustrated in phantom lines and illustrating the manner in which the vehicle may be towed behind an outboard motorboat or the like, portions of the associated motorboat being broken away;

FIG. 2 is a side elevational view of the assemblage illustrated in FIG. 1;

FIG. 3 is a front elevational view of the vehicle;

FIG. 4 is a side elevational view of the vehicle similar to FIG. 2 but illustrating the occupant-support beam portion of the vehicle in a rearwardly and upwardly inclined position so as to further elevate the occupant above the associated body of water;

FIG. 5 is a fragmentary top plan view of the rudder control airfoil members of the vehicle and illustrating the manner in which the airfoil rudder control members are interconnected for simultaneous oscillation with a foot engageable control portion of the vehicle;

FIG. 6 is a schematic view illustrating the manner which the occupant-support beam member portion of the vehicle is supported for oscillation about horizontal transverse and upstanding axes;

FIG. 7 is a fragmentary side elevational view of the lower portion of a modified form of vehicle adapted for over-the-ground use; and FIG. 8 is a fragmentary vertical transverse sectional view taken substantially upon the plane indicated by the section line 8—8 of FIG. 7.

Referring now more specifically to the drawings, the numeral 10 generally designates the vehicle of the instant invention which is illustrated in FIGS. 1 and 2 of the drawings as being towed behind a motorboat referred to in general by the reference numeral 12 powered by an outboard motor generally referred to by the reference numeral 14. The outboard motor 14 is supported from the transom 16 of the boat 12 and the forward end of a towline 18 is secured to the outboard motor 14 as at 20.

The vehicle 10 includes a water-planing assembly generally referred to by the reference numeral 22 and which includes a pair of elongated skis 24 provided with stationary rudders 26 on their rear ends and interconnected by means of horizontal bracing means 28 extending therebetween as well as an upstanding support structure referred to in general by the reference numeral 30.

The support structure 30 includes a pair of opposite-side downwardly divergent inverted V-shaped leg assemblies 32 and each of the leg assemblies 32 includes a pair of downwardly and outwardly inclined and divergent legs 34 interconnected at their upper end and secured to the corresponding ski 24 at their lower ends as at 38. A support shaft 40 has its opposite ends journaled through the upper extremities of the support structures 30 for limited oscillation and has a pair of limit plates 36 secured to its opposite ends. A support disc 46 is supported from the midportion of the shaft 40 and includes an upwardly projecting pivot pin 48. Accordingly, the support disc 46 is oscillatable with the shaft 40 relative to the leg assemblies 32.

An elongated beam 50 is oscillatably mounted on the pivot pin 48 between the limit plates 36 and retained on the pin 48 by a head 52 mounted on the top of the pin 48. The forward end of the beam 50 disposed forward of the pivot pin 48 has a pulley wheel 54 mounted on a horizontal transverse subaxle 56 projecting outwardly from the left side of the beam 50. The rear end of the beam 50 includes an occupant seat 56 and a reversely curving splash shield 58 has its forward end secured to the beam 50 as at 60 and curves rearwardly and downwardly away from the beam 50 and then rearwardly and slightly upwardly as at 62. In addition, an upper smoothly reversely curving support member 64 has its forward end secured to the beam 50 as at 68 and then rearwardly as at 70 to generally parallel the rear end of the beam 50. The shield 58 extends rearward of the seat 56 as does the support member 64 and a vertical support shaft 72 is secured between the rear ends of the splash shield 58 and the support member 64 rearward of the seat 56. Further, a second shaft 74 is journaled between the splash shield 58 and the support member 64 as well as through the beam 50 forward of the seat 56.

The shaft 72 has a rear rudder member 76 mounted thereon for oscillation relative thereto and the upper end of the shaft 74 projects above the support member 64 and has an upper rudder member 78 mounted thereon for oscillation therewith. A foot-engageable crossbar assembly referred to in general by the reference numeral 80 is mounted on the lower end of the shaft 74 between the splash shield 58 and the beam 50 and includes foot-engageable end portions 82 whereby the crossbar assembly 80 may be oscillated by the feet of the occupant 84 disposed on the seat 56. A second crossbar 86 is mounted on the shaft 74 immediately below the support member 64 and has its opposite ends connected to the outboard ends of a pair of outwardly projecting control arms 88 carried by the rudder member 76 by means of control rods 90. Accordingly, the crossbar 86 and the rudder members 76 and 78 are oscillatable with the crossbar assembly 80.

A winch assembly referred to in general by the reference numeral 92 is mounted on the beam 50 forward of the shaft 74 and includes a winding drum portion 94 as well as a ratchet wheel 96 with which a pivoted dog 98 controlled by hand lever 100 is engageable for preventing unwinding of the tension member 102 which is wound on the winding drum or member 94. The free end of the tension member 102 is trained about the pulley wheel 54 and has one end of an expansion spring 104 connected thereto. The end of the expansion spring 104 remote from the tension member 102 is anchored to the midportion of the brace means 28. Accordingly, it may be seen that the winch 92 may be actuated so as to vary the tension of the expansion spring 104 and thus counterbalance any desired portion of the weight of and supported by the rear end of the beam 50.

An elevator assembly referred to in general by the reference numeral 106 is provided and includes a pair of similar right- and left-hand elevator members 108 and 110 mounted on opposite ends of a support shaft 112 journaled through the beam 50. The elevator members 108 and 110 are secured to the shaft 112 for oscillation therewith and the forward end of a rearwardly projecting operating arm 114 is secured to the shaft. The arm 114 includes a handgrip portion 116 on its rear end operable by either hand of the occupant 56 and the winch 92 is provided with a handcrank 118 which is also engageable by the occupant 84.

The rear ends of the plates 36 define limits of oscillation of the beam 50 and thus the seat 56 for the occupant 84 cannot be displaced too far to either side of the longitudinal centerline of the vehicle 10 and the latter is therefore maintained reasonably stable at all times. Further, inasmuch as the pivot pin 48 is disposed forward of the brace means 28, the tension of the spring 104 is reduced as the beam 50 is swung from a centered position. Thus, as the seat 56 approaches its outward limit to either side of the centerline of the vehicle 10, the tension of the spring 104 will be automatically reduced thus tending to lower the rear end of the beam 50 and thus the center of gravity of the vehicle 10 as the center of gravity moves laterally away from the centerline of the vehicle.

In FIGS. 7 and 8 of the drawings it may be seen that the skis 24 may be provided each with front and rear ground-engaging support wheels 24' in order to adapt the vehicle 10 to move over ground surfaces. Of course, if the ground surfaces are snow covered, the skis 24 need not be provided with the wheels 24'. Further, the skis 24 may be constructed so as to be buoyant and thereby support the assembly 10 at least at the surface of the body of water upon which the vehicle 10 is to be used.

In operation, the occupant 84 may mount the seat 56 while the vehicle 10 is at rest and floating on the water. After the occupant has attained his seated position, he may actuate the winch 92 so as to properly counterbalance his weight. Then, upon the signal of the occupant 84, the operator of the boat 12 may cause the boat 12 to pull the vehicle 10. As soon as reasonable speed of the vehicle 10 is achieved, any desirable adjustments in the tensioning of the spring 104 may be accomplished through further actuation of the winch assembly 92 and the occupant 84 may then actuate the crossbar assembly 80 and the arm 114 so as to simulate flight maneuvering.

The splash shield 58 is utilized to protect the occupant 84 against spray from the water should the rear end of the beam 50 be accidentally lowered too close to the surface of the water and the occupant 84 may immediately untension the spring 104 by pulling back on the lever or control 100 so as to release the winding drum 94 of the winch 92.

In addition to the above operation, the airfoil means 76, 78, 108 and 110 may be eliminated. Then, as the vehicle 10 is towed over the surface of the body of water with the weight of the rear end of the beam 50 including the occupant 84 not quite fully counterbalanced by the expansion spring 104, the splash shield 58, by contact with surface irregularities of the water, will serve to upwardly deflect the rear end of the beam 50. Then, with the rear end of the beam upwardly inclined in a manner similar to that illustrated in FIG. 4 of the drawings, movement of the vehicle 10 and the occupant of the seat 56 through the air will cause a downward force to be exerted upon the rear end of the beam to swing it downwardly toward the water whereupon the splash shield 58 will cause downward swinging movement of the rear end of the beam to be checked. Of course, engagement of the splash shield 58 with the water will again cause the rear end of the beam 50 to swing upwardly toward the position thereof illustrated in FIG. 4. Thus, with the airfoil means removed, the vehicle 10 will automatically give the occupant 84 a cycling up-and-down ride with a reasonably large splash or spray of water at the termination of each downward movement of the beam 50 as the vehicle 10 is being towed over a body of water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A vehicle including an elongated support-surface-engaging assembly having front and rear ends and adapted to be towed over a support surface, said assembly including an elevated support structure, an elongated generally horizontal beam having front and rear ends, support means pivotally supporting said beam from said support structure for vertical oscillation about a horizontal axis extending transversely of said assembly and the forward end portion of said beam, an occupant-supporting station being defined on the rear end portion of said beam, force means operatively connected between said beam and assembly yieldingly urging said beam to rotate relative to said support structure in a direction raising the rear end of said beam so as to counterbalance at least a portion of the greater weight of the rear end of the beam when supporting an occupant of said vehicle, generally horizontal airfoil means supported from the rear end portion of said beam for oscillation about a horizontal transverse axis and adapted to be selectively oscillated by said occupant, said support means also including means oscillatably supporting said beam for limited oscillation relative to said support structure about an upstanding axis fixed relative to said beam and thus angularly displaceable with said beams relative to said support structure, said beam also including upstanding airfoil means supported from said beam for oscillation about an upstanding axis and adapted to be selectively oscillated by said occupant, said ski assembly including a pair of laterally spaced elongated skis between whose rear ends the rear end of said beam is lowerable.

2. A vehicle including an elongated support-surface-engaging assembly having front and rear ends and adapted to be towed over a support surface, said assembly including an elevated support structure, an elongated generally horizontal beam having front and rear ends, support means pivotally supporting said beam from said support structure for vertical oscillation about a horizontal axis extending transversely of said assembly and the forward end portion of said beam, an occupant-supporting station being defined on the rear end portion of said beam, force means operatively connected between said beam and assembly yieldingly urging said beam to rotate relative to said support structure in a direction raising the rear end of said beam so as to counterbalance at least a portion of the greater weight of the rear end of the beam when supporting an occupant of said vehicle, said assembly including a ski assembly adapted to be towed over water, said ski assembly including a pair of laterally spaced elongated skis between whose rear ends the rear end of said beam is lowerable, said beam including a rearwardly and downwardly curving spray shield and planing member disposed forward of said occupant supporting station adapted to contact the water over which said vehicle is being towed so as to check downward swinging movement of the rear end of said beam while at the same time protecting the occupant from direct contact with the water.

3. A vehicle including an elongated support-surface-engaging assembly having front and rear ends and adapted to be towed over a support surface, said assembly including an elevated support structure, an elongated generally horizontal beam having front and rear ends, support means pivotally supporting said beam from said support structure for vertical oscillation about a horizontal axis extending transversely of said assembly and the forward end portion of said beam, an occupant-supporting station being defined on the rear end portion of said beam, force means operatively connected between said beam and assembly yieldingly urging said beam to rotate relative to said support structure in a direction raising the rear end of said beam so as to counterbalance at least a portion of the greater weight of the rear end of the beam when supporting an occupant of said vehicle, said horizontal axis extending transversely of said beam rearward of the front end thereof, guide means carried by the front terminal end portion of said beam, said force means including an elongated flexible pull member extending along said beam from the rear end portion thereof to and guidingly engaged by said guide for longitudinal shifting relative thereto and then extending rearwardly and downwardly from said guide means, and expansion spring means connected between said assembly and the rearwardly and downwardly extending portion of said pull member.

4. The combination of claim 3 wherein said force means also includes winding means supported from the rear end portion of said beam for actuation by said occupant and operable to wind selected amounts of said pull member thereon.